United States Patent
Al Ghatta et al.

(10) Patent No.: US 6,365,249 B1
(45) Date of Patent: Apr. 2, 2002

(54) POLYESTER RESIN FOAMED SHEETS

(75) Inventors: Hussein Al Ghatta, Fiuggi; Guido Ghisolfi, Tortona, both of (IT)

(73) Assignee: Sinco Ricerche S.p.A., Verbania Pallanza (IT)

( * ) Notice: Subject to any disclaimer, the term of this patent is extended or adjusted under 35 U.S.C. 154(b) by 0 days.

(21) Appl. No.: 09/400,918

(22) Filed: Sep. 21, 1999

(30) Foreign Application Priority Data

Sep. 25, 1998 (IT) .......................................... MI98A2078
Sep. 29, 1998 (IT) .......................................... MI98A2081
Oct. 14, 1998 (IT) .......................................... MI98A2208

(51) Int. Cl.$^7$ ............................................... B29D 22/00
(52) U.S. Cl. ...................... 428/36.6; 428/367; 521/182; 521/135
(58) Field of Search ............................. 428/36.6, 36.7; 521/182, 135

(56) References Cited

U.S. PATENT DOCUMENTS 5,000,991 A * 3/1991 Hayashi et al. ............. 521/138

FOREIGN PATENT DOCUMENTS

EP 0836937 A2 * 4/1998

* cited by examiner

*Primary Examiner*—Morton Foelak
(74) *Attorney, Agent, or Firm*—Guido Modiano; Albert Josif; Daniel O'Byrne

(57) ABSTRACT

Polyester resin foamed sheet, usable for the production of containers for beverages and foods, having a density lower than 700 kg/m$^3$ and crystallization rate such that, when the material is heated at 120° C. for 5 minutes, the crystallinity does not reach values higher than 15%. The aromatic polyester resin used for preparing the foamed sheet can be mixed with an aliphatic polyester resin to impart biodegradability and/or compostability to the sheet.

16 Claims, No Drawings

POLYESTER RESIN FOAMED SHEETS

The present invention regards a polyester resin foamed sheet, which is heat-sealable, and suitable for the production of beverage and food containers, on which a design from which the shape of the container can be developed by folding can be stamped by pressing.

The invention includes the containers obtained from such sheet. It regards in particular a sheet having gas barrier properties suitable for the production of containers for beverages such as fruit juices, medium shelf-life milk, tea and similar.

BACKGROUND OF THE INVENTION

The materials employed till now for the production of beverage and food containers such as containers for fruit juices, milk or other, include substantially a functional layer of cardboard which gives to the container mechanical properties, in particular rigidity, and, adhered to the cardboard, in some cases, a layer of thin sheet of aluminum coated, on the side which comes into contact with the beverage or food, by a polyethylene film or similar polymeric material.

Containers produced with such multi-layer materials are difficult to recycle due to the different chemical nature of the various layers.

The recyclability of the material forming a food or beverage container is a most important requisite both from the point of view of savings that recycling allows to be obtained and from an ecological aspect.

The possibility of having a recyclable material is a very important topic in the sector.

Containers for beverages and liquids produced of polymeric materials exist but do not offer characteristics of rigidity comparable to those of cardboard and for this reason they do not result in being suitable to produce rigid containers. The containers obtained with such materials are comprised into the category of small sacks (pouches).

The attempt to obtain containers with the necessary rigidity by using polymeric materials has failed until now.

The rigidity in the containers is in function of the thickness of the wall and more precisely varies with the cube of the wall thickness.

The use of polymeric material such as polyolefins for the production of containers having sufficient rigidity would imply a thickness which is not economical and, furthermore, is not processable due to the difficulty in folding and sealing that one encounters in the container closing phase.

Another material such as foamed polystyrene is not employable due to its fragility when it is conformed into thin layers.

Known from the patent literature (U.S. Pat. No. 5,000, 991) are rigid laminates, which are used for the preparation of thermoformed containers for victuals, formed of a sheet of foamed polyester material and of a film of the same nature as the sheet, or of other polymeric material. Known from EB-A-836937 are semi-rigid laminates having a thickness of 0.5 to 1.5 mm comprising a layer of polyester resin foam having a density of 0.7 to 1 g/cm$^3$ on which a layer having gas barrier properties, made of a polymeric material different from that of the layer in polyester foam, is adhered.

The laminates are used for the preparation by thermoformation of articles for packaging.

Materials comprising a layer in polyester foam capable of being creased to form, by folding according to the design pressed on the material, the shape of the container, are not known in patent literature.

The capability of a mono-layer or multi-layer polymeric foamed material, to be creased with a design set to develop by folding the shape of a container, and the foldability of the material according to such a design, constitute indispensable requirements for the production of beverage and food containers when using the creasing and folding technique.

A material is suitable for creasing if the design pressed on it remains stable over time and if when stamping such design, breakage which could impair the possibility of folding the material does not occur.

Moreover the material must be heat-sealable so as to make possible the closure of the container.

It has now unexpectedly been found a polymeric material of polyester resin foam, which is suitable for the production of beverage and food containers, satisfying the above mentioned creasing requirements, and which presents rigidity sufficient to substitute cardboard.

SUMMARY OF THE INVENTION

The foamed material of the present invention comprises, or is made of, a substantially amorphous (containing less than 5% crystallinity) foamed sheet obtained from a polyester resin, having crystallization rate such that, by heating at 120° C. for 5 minutes, the crystallinity does not reach values higher than 15% and preferably does not reach values higher than 10%.

DETAILED DESCRIPTION OF THE INVENTION

The polyester resin preferably used for the preparation of the foamed sheet is a copolyethylene terephthalate in which from 2 to 20% in moles of units of terephthalic acid are substituted by units deriving from isophthalic and/or naphthalene-dicarboxylic acids.

Preferably, the copolyethylene terephthalate comprises from 4 to 10% of units deriving from isophthalic acid.

With the aim of improving the gas barrier properties of the foamed sheet, the same can be coated with a polyester resin film or other material having gas barrier properties.

In the case in which the sheet is covered with a polyester film, the barrier properties of the latter are conferred by subjecting the film to surface treatment giving it barrier properties or by the application of materials with barrier properties such as aluminum and oxides of aluminum and silicon ($Al_2O_3$ and $SiO_x$).

A representative surface treatment is the lacquering of the film with a layer of lithium or potassium polysilicate. The treatment allows the realization of very slow oxygen permeation rates, which can be 0.3 ml/m$^2$/24 h/atm or less.

The application of layers of aluminum and oxides of Al and/or Si is carried out according to known methods.

The surface treatments and the deposition of barrier materials are selected and carried out in a way such as to confer to the polyester film oxygen permeability properties generally lower than 70 ml/m$^2$/24 h/atm (ASTM 1434). In the case of a film metallized with Al or coated with oxides of Al and/or Si, the rate of oxygen permeability can be reduced to values lower than 0.3 ml/m$^2$/24 h/atm. Values lower than 10 ml/m$^2$/24 h/atm are preferred. Polyester films metallized with aluminum are commercially obtainable under the name of Nu Roll of Nurol S.p.A. (Nu Roll is a registered trade mark of Nurol S.p.A.).

In the case where a film with barrier properties is adhered on the sheet, the untreated side of this film is the one which comes into contact with the beverage or food inside the container.

It is also possible, and this is in function of the various requirements, such as for example printing with inks or other, to use a film corresponding to the above requirements as external layer having the foamed sheet onto which the film is adhered as the internal layer.

The adhesion of the film with barrier properties or other film on the foamed sheet, can be realized according to known methods by gluing or heat-lamination or by coextrusion.

The foamed sheet of this invention has a thickness between 0.2 and 3 mm, most preferably between 0.2 and 1.5 mm. The density of the sheet is lower than 700 kg/m$^3$ and is preferably between 10 and 500 kg/m$^3$, most preferably between 100 and 200 kg/m$^3$.

It is also possible to cover the foamed polyester sheet with a layer of a heat-sealable polymer different from the polyester resin.

The preparation of the foamed sheet is carried out according to known extrusion-expansion methods.

A preferred method is that disclosed in U.S. Pat. No. 5,362,763, the description of which is herewith incorporated by reference.

Other methods are those disclosed in U.S. Pat. No. 5,362,763, the description of which is also incorporated by reference.

The rigidity of the foam sheet is in function of the thickness of the same: it increases (not proportionally) with the thickness. The use of inorganic fillers (usable up to about 20% by weight) allows an increase of the sheet rigidity. Examples of fillers are silica, alumina, titanium dioxide, calcium carbonate and similar.

The production of the containers is realized according to known methods by folding from a design pressed on the sheet by creasing, set to develop the shape of the container.

The containers can have different shape and volume according to their end use. Cubic, oblong or pyramid shapes can be used. Generally the volume of the containers for beverages and fruit juices is between 0.2 and 2 liters.

The polyester used for the preparation of the foamed sheets is obtainable by polycondensation of an aromatic bicarboxylic acid, preferably terephthalic acid, with a diol of 2–12 carbon atoms such as ethylene glycol, 1,4-buthane-diol and 1,4-dimethylolcyclohexane and is preferably selected from the polyethylene terephthalate copolymers in which up to 20% by moles of unit deriving from terephthalic acid are substituted by units deriving from isophthalic acid and/or a naphthalene-dicarboxylic acid.

To impart biodegradability and/or compostability to the foamed sheet, the polyester resin used to prepare the sheet is mixed with 10–35% by weight of a biodegradable aliphatic polyester resin, and the mixture is subjected to a reaction of polyaddition in the solid state in the presence of a dianhydride of a tetracarboxylic acid, preferably aromatic.

Pyromellitic anhydride is the preferred dianhydride and is employed in a quantity from 0.05% to 2% by weight of the total quantity of resin.

The reaction of polyaddition in the solid state is carried out at a temperature from about 150 to 220° C., for periods of time and with dianhydride concentration sufficient to obtain resin intrinsic viscosity values higher than 0.7 dl/g (viscosity measured at 25° C. in a mixture 60/40 by weight of phenol and tetrachloroethane) and values of melt strength sufficiently high to allow foaming of the resin.

The intrinsic viscosity is generally comprised between 0.8 and 1.2 dl/g.

Suitable melt strength values are higher than 8 centinewton, and preferably higher than 20 centinewton.

The measurement of melt strength is carried out with the use of a Geottfert capillary rheometer according to the method disclosed in U.S. Pat. No. 5,442,381, the description of which is herewith incorporated by reference.

The aliphatic polyester resin is obtained by polycondensation of a hydroxy-acid with 2–22 atoms of carbon or its lactone or lactide, or by polycondensation of an aliphatic bicarboxylic acid with 2–22 carbon atoms with an aliphatic or aromatic diol with 2–22 carbon atoms. Polycaprolactone is the preferred polyester. The above polyesters have the characteristic of being biodegradable.

EXAMPLES

The following examples are provided to illustrate but not limit the invention.

Example 1

A sheet of foamed COPET (copolyethylene terephthalate containing 4% by weight of isophthalic acid), with a thickness of 0.7 mm and a density of 180 kg/m$^3$, and with a crystallization rate such that if heated at 120° C. the crystallinity does not reach values higher than 15%, coming from a bobbin is creased with a design to develop after folding a container having a parallelepipedon shape.

The creased sheet is used for the preparation of containers for medium length shelf-life milk and for fruit juices.

The container is closed by heat-sealing. The closure is hermetically sealed, and is easily openable by tearing, or by cutting or by other methods.

Example 2

A PET foamed sheet with the characteristics reported in Example 1, is adhered with the use of a glue compatible with recyclability of the container, to a Nu Roll metallized film of Nurol S.p.A. with a thickness of 15 micron.

The sheet is utilized for the production of containers for liquids.

Example 3

A foamed sheet obtained from copolyethylene terephthalate containing 4% of units of isophthalic acid, mixed with 10% by weight of polycaprolactone UC PCL 787 from Union Carbide, and then subjected to polyaddition in the solid state at 180° C. until inherent viscosity of 0.85 dl/g is obtained) having a thickness of 0.7 mm, a density of 180 kg/m$^3$, and a crystallization rate such that, when heated at 120° C., the crystallinity does not reach values higher than 15%, is pressed according to a design intended to develop by creasing a container of parallelepipedon shape.

The creased sheet is used for the preparation of containers for medium shelf-life milk and for fruit juices.

The containers are closed by heat-sealing. The closure is maintained hermetical and is easily openable by tearing, by cutting or by other methods. The containers subjected to composting under normal operational conditions used in composting processes, result compostable.

Example 4

A foamed PET sheet having the characteristics of Example 3, is adhered by gluing with glue which is compatible with the recyclability of the container, to a Nu Roll metallized film of thickness 15 micron of Nurol S.p.A.

The sheet is utilized for the production of containers for liquids.

What we claim is:

1. A material suitable for production of beverage and food containers by folding according to a design pressed on the material by creasing, set to develop the shape of the container, the material comprising a substantially amorphous foamed sheet having a crystallinity lower than 5%, obtained from polyester resin, having density lower than 700 kg/m3 and a crystalization rate such that, by heating at 120° C. for 5 minutes, the crystallinity does not reach values higher than 15%, in which the sheet is adhered to a film having gas barrier properties.

2. The multi-layer material according to claim 1, in which a polyester film is adhered, said polyester film having an oxygen permeability rate lower than 70 ml/m$^2$/24 h/atm (measurement according to ASTM 1434).

3. The material according to claim 2, in which the polyester film is metallized with aluminum or coated with a layer of aluminum or silicon oxide, or with potassium or lithium polysilicates.

4. The material according to claim 1, in which the film with gas barrier properties is rendered adherent to the foamed sheet by the use of glues or by heat lamination.

5. A beverage or food container, manufactured from the material of claim 4 by folding according to a design pressed on the material by creasing, set to develop the shape of the container.

6. The container according to claim 5, having a closure which is realized by heat-sealing.

7. A container for fruit juices or for sterilized milk, manufactured by using a material of claim 1, in which the foamed sheet is made to adhere to a film having oxygen barrier properties corresponding to permeation rate values lower than 70 ml/m$^2$/24 h/atm.

8. The container according to claim 7, in which the film adhered to the sheet presents an oxygen permeability rate lower than 10 ml/m$^2$/24 h/atm.

9. The material according to claim 1, in which the sheet is obtained from a copolyethylene terephthalate containing from 2 to 20% by moles of unit deriving from isophthalic acid and/or naphthalene-dicarboxylic acids.

10. The material according to claim 1, in which the crystallization rate of the sheet is such that by heating at 120° C. for 5 minutes the crystallization is lower than 10%.

11. The material according to claim 1, in which the foamed sheet has density between 10 and 500 Kg/m$^3$.

12. The material according to claim 1, in which the foamed sheet has density between 100 and 200 Kg/m$^3$.

13. The material according to claim 1, having a thickness from 0.2 to 3 mm.

14. The material according to claim 13, having a thickness of 0.2 to 1.5 mm.

15. The material according to claim 1, in which the sheet includes an inorganic filler.

16. The material according to claim 1, in which the foamed sheet is obtained from an aromatic polyester resin mixed with 10–30% by weight of an aliphatic polyester resin.

* * * * *